March 13, 1951 S. P. HUNT 2,545,281
FABRIC MOISTURE ABSORBENCY TESTER
Filed Oct. 19, 1948 4 Sheets-Sheet 3
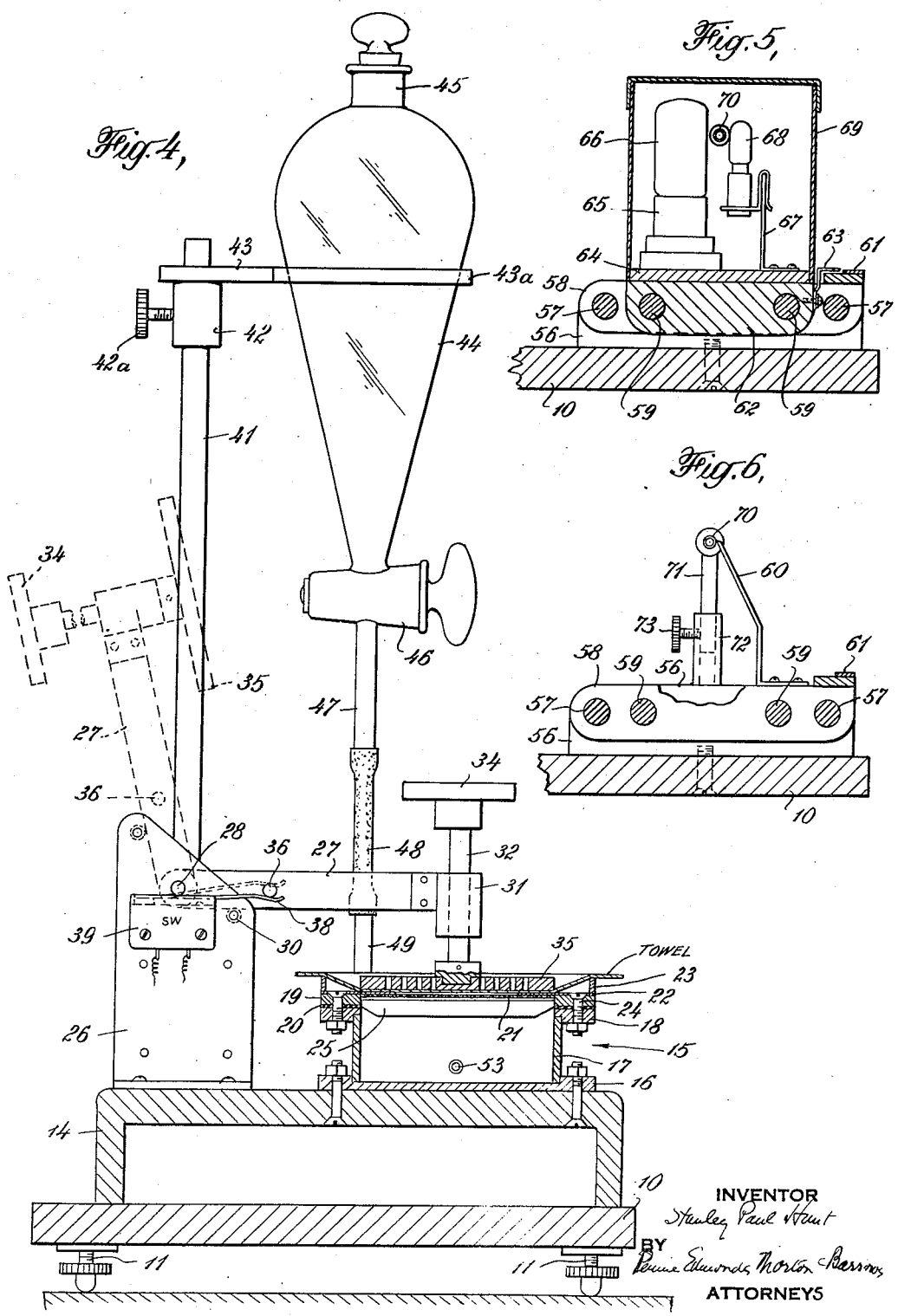

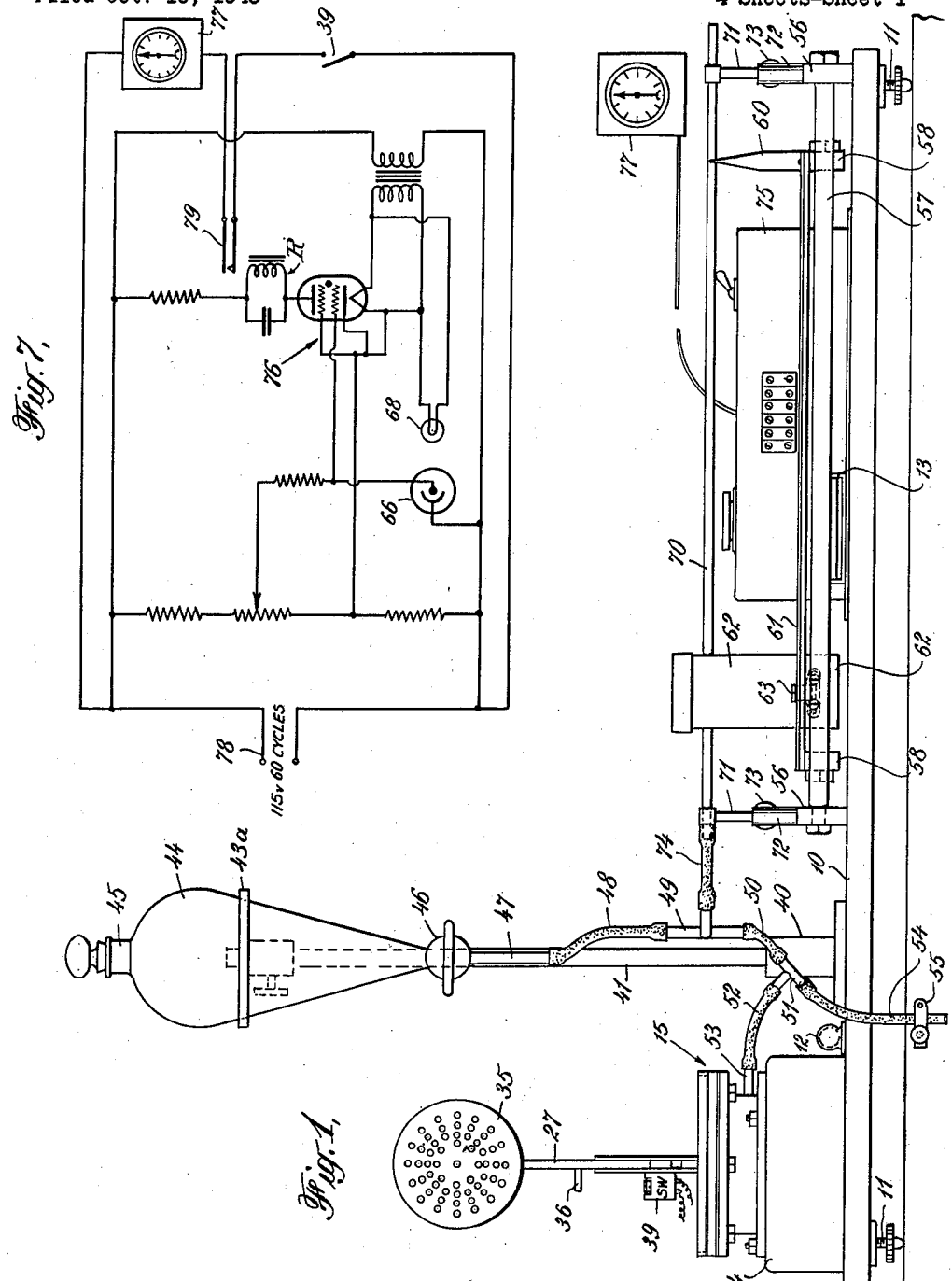

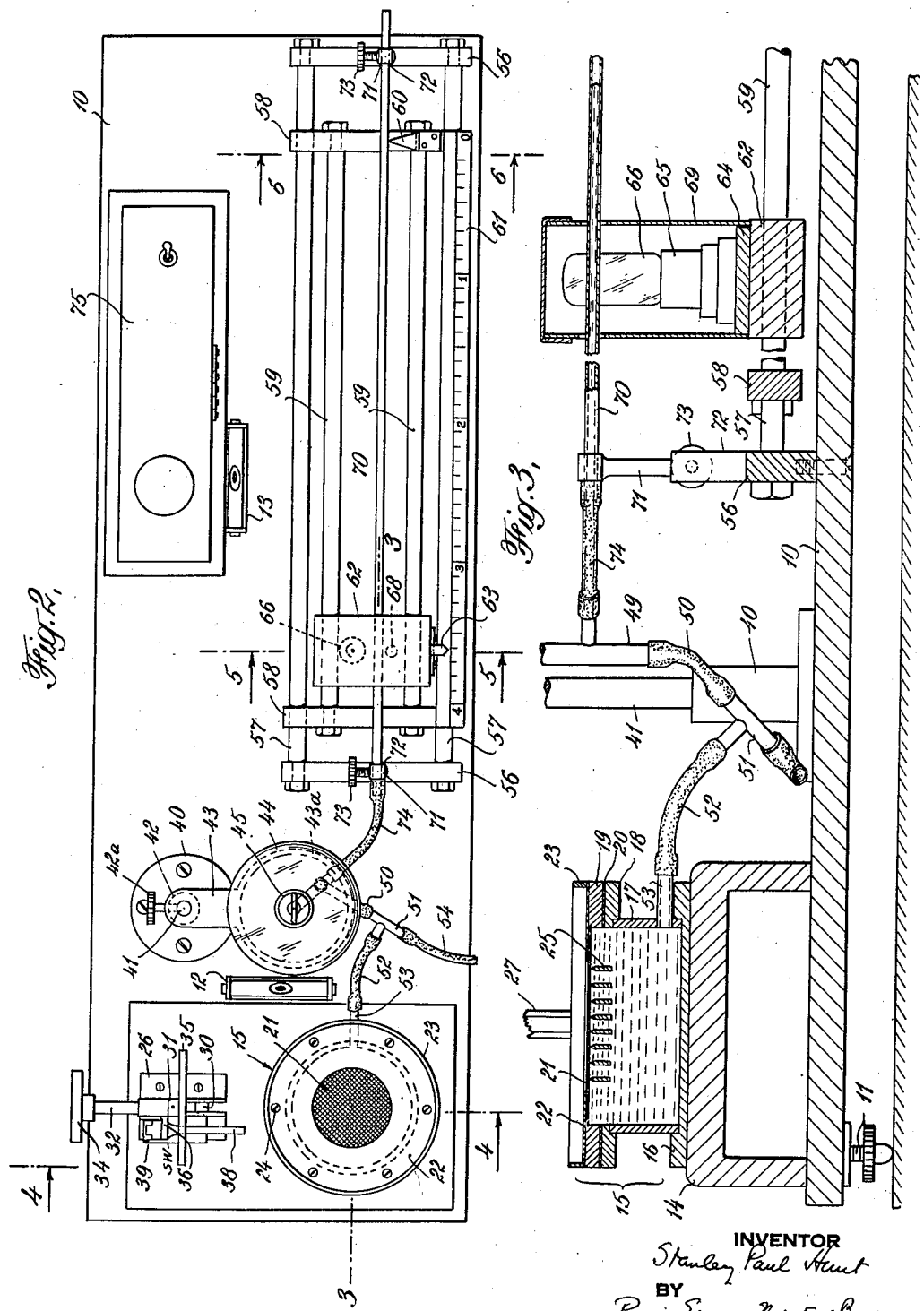

March 13, 1951  S. P. HUNT  2,545,281
FABRIC MOISTURE ABSORBENCY TESTER
Filed Oct. 19, 1948  4 Sheets-Sheet 4

INVENTOR
Stanley Paul Hunt
BY
Pennie Edmonds Morton Barrows
ATTORNEYS

Patented Mar. 13, 1951

2,545,281

UNITED STATES PATENT OFFICE 2,545,281

FABRIC MOISTURE ABSORBENCY TESTER

Stanley Paul Hunt, Charlottesville, Va., assignor to Institute of Textile Technology, Charlottesville, Va., a corporation of Virginia Application October 19, 1948, Serial No. 55,383

14 Claims. (Cl. 73—73)

This invention relates to instruments for determining the liquid absorbency characteristics of specimens of different materials. More particularly, the invention is concerned with a novel instrument for determining the rate, at which a liquid is absorbed by a specimen, and also the rates, at which a specimen absorbs liquid during successive stages of absorption. The new instrument is of simple inexpensive construction and it is easy to operate and maintain in working condition. In the use of the instrument, it is not necessary to employ a specimen of specific size and the instrument may thus be used for determining the absorbency of a finished article without mutilation of the article. The instrument may be employed in testing specimens of materials of various kinds and may be advantageously used in the textile industry to determine the rate, at which water is absorbed by fabrics, for example, terry and diaper cloths. A form of the instrument suitable for use in fabric testing will, accordingly, be illustrated and described in detail for purposes of explanation.

The problem of measuring the rate of absorption of water by textile products has had attention over a long period of time and various tests have been developed for the purpose. When it is desired to determine the rate at which a yarn or fabric will be wet when immersed in a solution in a manufacturing operation, the test employed involves immersing a standard skein of the yarn in water and noting the time required for the replacement of the attached air bubbles by water. While this test has been useful in determining the action of wetting agents, it is not satisfactory for evaluating the behavior of fabrics, such as towels, diapers, etc. in taking up moisture from the body.

A test, that has been developed for determining the water absorbency of towels and like fabrics, involves allowing the specimen to soak up moisture through a porous plate of ceramic material, and then weighing the specimen after various periods of time. Such a test is not satisfactory in that, in the handling of the specimen to weigh it, unknown amounts of moisture evaporate and this introduces errors. Also, in order to obtain time intervals sufficiently long for convenient handling of the sample, the plate must have very fine pores, so that most of the resistance to flow of the water occurs in the plate and not in the sample. This makes the test insensitive to changes in the properties in the sample in this range and also it is difficult to obtain plates, which are of uniform resistance and will thus give the same results for a given sample at different times. A further difficulty is that the porosity of a given plate varies in the course of time because of the clogging of the pores by fibers, etc.

The present invention is directed to the provision of an instrument for measuring the absorbency of materials, which overcomes the objections to the prior testing equipment and determines the rate of absorption under conditions approximating those of the use of the article. The new instrument makes possible the determination of the rate, at which a material absorbs liquid during a short period of time, and of the rates of absorption during successive stages. In the instrument, the rate of take-up of the liquid is dependent wholly on the characteristics of the sample and is not affected by extraneous factors, such as the resistance of a porous plate to the flow of the liquid therethrough. The instrument operates automatically, when the sample is brought into contact with the liquid, to start a timing device and to stop the device, when a given quantity of liquid has been taken up. As the liquid is freely supplied to the sample during the determination and the timing is automatic, the results given by the instrument are of a high degree of accuracy.

For a better understanding of the invention, reference may be had to the accompanying drawings, in which Fig. 1 is a view of the new instrument in front elevation;

Fig. 2 is a plan view of the instrument;

Figs. 3, 4, 5, and 6 are sectional views on the lines 3—3, 4—4, 5—5, and 6—6, respectively, of Fig. 1;

Fig. 7 is a wiring diagram of one form of the instrument;

Figure 8:
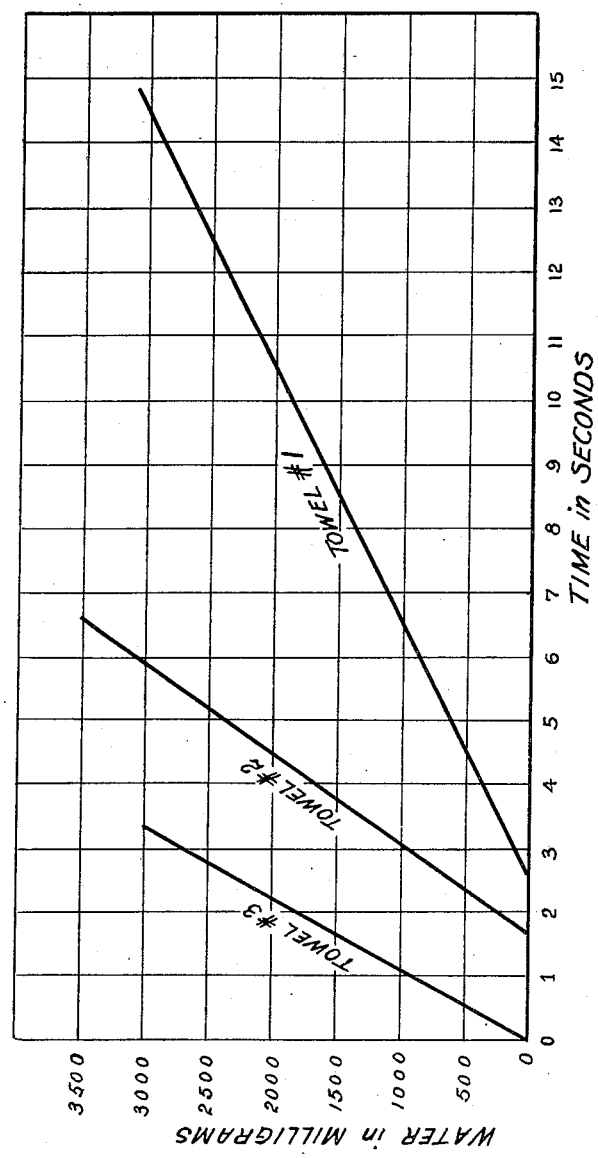
Fig. 8 is a graph showing results obtained in testing three specimen towels.

The instrument in the form illustrated comprises a base 10 mounted upon leveling screws 11 and carrying a pair of spirit levels 12, 13 disposed at right angles to one another, so that the base can be placed on a supporting surface in exactly horizontal position. At one end, the base carries a support 14, on top of which is mounted a vessel 15 for the liquid to be absorbed. The vessel comprises a base plate 16, on which is mounted a section 17 of a hollow cylinder provided at its top with a flange 18, on which rests a flat ring 19 with a gasket 20 interposed between the flange and the ring. A screen 21 is mounted in the opening through the flat ring 19 and a top plate 22 of less inner diameter than the diameter of the screen is mounted on top of the ring. The top plate is provided with a peripheral tubular flange 23 and the top plate and the flat ring 19 are secured to flange 18 by a plurality of bolts 24, which pass through openings in the top plate, ring, gasket, and flange. The screen is supported from beneath by a plurality of stiffener bars 25, which are attached at their ends to the inner surface of the flat ring 19 and extend in parallel relation beneath the screen. Each stiffener bar has a knife edge at its top, which contacts with the screen, so that the bars support the screen without closing the meshes thereof.

The screen 21 used in the instrument is preferably wire cloth of 50 or 60 mesh woven in a twill weave. The individual wires are of a corrosion resistant metal, such as Monel metal, and about .011″ in diameter. The top plate is made of metal and about .01″ in thickness, and the top of the screen is in contact with the bottom of the top plate. The opening through the top plate determines the area of the sample, by which the liquid is to be taken up, and the opening may conveniently have an area of 25 sq. cm. While a wire cloth screen is preferred, the screen may be of plastic material having openings fine enough to transmit the liquid by capillarity to the sample but of sufficient size, so that the resistance to flow of the liquid through the screen openings is negligible.

A pair of plates 26 are mounted on the support 14 to the rear of vessel 15 with their faces parallel. An arm 27 is mounted on a horizontal pivot pin 28 received in openings in the plates and the arm is free to swing in a vertical plane, which passes through the center of the screen. The plates 26 are connected by a stop pin 30, which is engaged by the arm 27 and prevents it from passing below the horizontal, when it is swung down from an upright position. The arm 27 carries a tubular guide 31 at its outer end, in which is movably mounted a stem 32 carrying a handle or knob 34 at one end and a perforated pressure plate 35 at the other end. The plate 35 has a diameter approximately the same as the inner diameter of the flat ring 19. The construction is such that, when the arm 27 is swung to horizontal position to come to rest against the stop pin 30, the pressure plate 35 is concentric with the flat ring 19. Arm 27 is provided with a pin 36, which engages the operating arm 38 of a switch 39 to close the switch, when the arm comes to rest against pin 30.

A socketed fitting 40 is mounted on base 10 at one side of support 14 and to the rear of vessel 15. An upright rod 41 is mounted in the fitting and a bushing 42 is adjustably mounted on the rod and held in position by a set screw 42a. The bushing carries an arm 43, which encircles the rod and terminates at its free end in a ring 43a, in which is supported a glass tank 44 for the liquid to be absorbed. The tank has an inlet 45 at its upper end closed by a stopper and, at its lower end, has a plug valve 46, from which leads an outlet tube 47. The outlet tube is connected by a length of rubber tubing 48 to one leg of a T 49, the opposite leg of which is connected by a length of tubing 50 to one leg of a T 51. Another leg of T 51 is connected by a length of tubing 52 to an inlet tube 53, which is inserted in an opening through cylinder 17. The third leg of T 51 carries a length of tubing 54, which is provided with a shut-off 55.

A pair of end plates 56 are mounted on base 10 at one side of support 14 and are connected by parallel guide rods 57 extending lengthwise of the base. The guide rods pass through openings in a pair of slide plates 58, which are connected by parallel slide rods 59 to form a frame. One of the slide plates 58 carries a pointer 60 and the slide plates are connected by a bar 61 carrying a scale. A carriage 62 is mounted to slide on rods 59, which pass through openings in the carriage. The carriage is provided with a pointer 63 adjustably mounted thereon and pointing to the scale on bar 61. A tube base 64 mounted on the carriage carries a socket 65 for a photocell 66 and a bracket 67 mounted on base 64 is provided with a socket for a lamp 68, which lies in front of the photocell and spaced therefrom. The lamp and the photocell are enclosed within a casing 69.

A capillary tube 70 is mounted in loops on stems 71, which are received in sockets in members 72 threaded into openings in the end plates 56. Each member 72 has a thumb screw 73 to engage its stem and hold it in adjusted vertical position. The capillary tube extends through casing 69 between lamp 68 and photocell 66 and one end of the tube is connected by a length of rubber tubing 74 to the third leg of T 49. In the use of the instrument, the capillary tube is mounted in horizontal position and pointer 60 terminates close to the tube.

A housing 75 is mounted on top of base 10 to the rear of the capillary tube structure. Within the housing is an amplifying unit, generally designated 76. The instrument is also provided with an electrically driven timer 77, which indicates time in seconds and fractions thereof. As shown in the wiring diagram, the timer is connected across a power line 78 and the timer circuit includes a switch 79 normally closed and capable of being opened by a relay R operated by the amplified output of the photocell 66. The timer circuit also includes the starting switch 39 operable by arm 27.

In the use of the instrument, the capillary tube is initially adjusted to horizontal position, with the lower edge of the tube passage in the level of the top of the screen 21. A quantity of liquid to be absorbed, such as water, is then permitted to flow from tank 44, until the level of the liquid in the vessel 15 is at the top of the level of the screen and the end of the liquid column in the tube is at a convenient point near the zero end of the scale on bar 61. The arm 27 is raised to upright position and the knob 34 is pulled outwardly to bring the perforated plate 35 against the end of guide 31. The sample is then laid to rest on top of flange 23 out of contact with the screen. The slide structure, comprising slide plates 58 and rods 59, is moved on rods 57 to bring the pointer 60 in exact alignment with the end of the liquid column in the capillary tube. The photocell carriage 62 is next moved along rods 59 until its pointer 63 indicates the desired point on the scale on bar 61. The scale is in terms of milligrams of liquid and pointer 63 indicates the number of milligrams of liquid between pointer 60 and the photocell.

To test the absorbency of the sample, the operator grasps the knob 34 on the stem carrying the perforated plate 35 and swings the arm down to the horizontal, simultaneously pushing on the stem. Plate 35 thus depresses the unsupported part of the sample within flange 23 into contact with the screen and, since the final movement of the plate and sample is in a vertical direction, the sample makes instantaneous contact with the entire exposed area of the screen. As the arm 27 reaches the horizontal, switch 39 is closed and the timer starts to operate. So long as the beam from lamp 68 passes through liquid in the capillary tube on its way to the target surface of the photocell, no action occurs, but, as the sample takes up liquid, the liquid flows from the capillary tube and, when the end of the liquid column passes through the beam from the lamp, a shadow is cast on the photocell and this results in energization of the relay R, the opening of switch 79, and the stopping of the timer.

The results obtained with the instrument in testing the absorbency of three different towel samples are represented in the graph of Fig. 8. Of these samples, those designated towel #1 and towel #2 were new towels manufactured by different companies and towel #3 was one, which has been in regular domestic use for a considerable period and laundered several times. Experience with the instrument has shown that the rate of absorbency is linear with respect to small quantities of water, when the fabric does not approach saturation, and the slope of the curves on the graph is thus the rate of absorption. This rate may be expressed in terms of milligrams of water absorbed per square centimeter of exposed fabric per second and, for convenience, is referred to as an absorbency factor. The time required for the fabric to begin to pick up water is a significant factor in considering the characteristics of a sample and this factor, which may be termed the "induction factor," is the distance from the origin to the intercept of the curve with the time axis. The induction period may be obtained directly from the graph by extrapolation. As shown by the graph, the induction factor was 2.5 seconds for towel #1 and 1.65 seconds for towel #2, both of which were new towels. Towel #3, which had been in use and laundered repeatedly, had a zero induction factor. The absorbency factor of the three towels was 10, 28.2, and 35.3, respectively, which indicates that the laundered towel was superior in this respect to either of the two new towels and that towel #2 was superior to towel #1.

Figure 9:
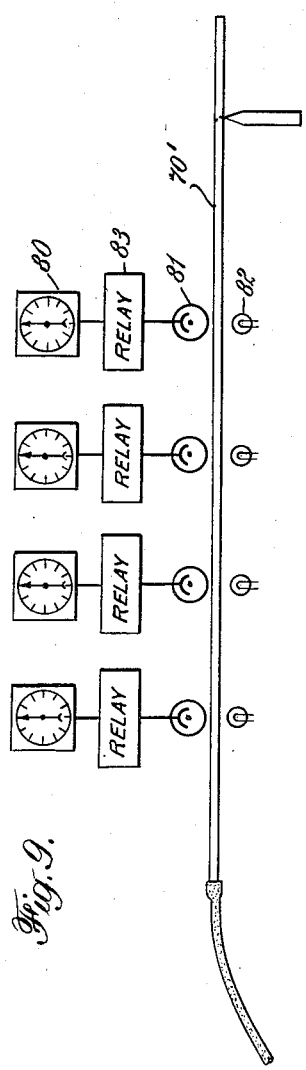
Fig. 9 is a diagrammatic view illustrating a modified form of the instrument.

The modified form of the instrument shown in Fig. 9 is generally similar to that described, except that it is provided with a plurality of timers 80, all of which are started simultaneously, when the sample is depressed into contact with the screen. Each timer is provided with its own photocell 81, lamp 82, and switch controlled by a relay 83, so that, as the end of the water column in the capillary tube 70' passes the successive photocells, the timers controlled thereby are stopped. With this form of the instrument, it is possible to determine the rate of absorption of a sample at different stages in a continuous absorption operation.

I claim:

1. Apparatus for measuring the rate of absorption of a liquid by a sample of material, which comprises a vessel having a top opening, a screen mounted horizontally across the opening, a capillary tube connected at one end to the vessel and mounted horizontally with its passage in the plane of the screen, means for supplying the liquid to the vessel and tube, a timing device, means for pressing the sample upon the screen and simultaneously starting the timing device, and means operable, when the end of the liquid column in the tube has passed beyond a selected point, for stopping the timing device.

2. Apparatus for measuring the rate of absorption of a liquid by a sample of material, which comprises a vessel having a top opening, a screen mounted horizontally across the opening, a capillary tube connected at one end to the vessel and mounted horizontally with its passage in the plane of the screen, means for supplying the liquid to the vessel and tube, a timing device, means for pressing the sample upon the screen and simultaneously starting the timing device, means for passing a beam of light through the liquid column in the tube at a selected point, and means responsive to the change in the beam, when the end of the liquid column has passed beyond the beam, for stopping the timing device.

3. Apparatus for measuring the rate of absorption of a liquid by a sample of material, which comprises a vessel having a top opening, a screen mounted horizontally across the opening, a capillary tube connected at one end to the vessel and mounted horizontally with its passage in the plane of the screen, means for supplying the liquid to the vessel and tube, a timing device, means for pressing the sample upon the screen and simultaneously starting the timing device, means for passing a beam of light through the liquid column in the tube at a selected point, a photocell in the path of the beam beyond the tube, and means operating in response to the variation in the output of the photocell caused when the end of the liquid column has passed beyond the beam, to stop the timing device.

4. In apparatus for measuring the rate of absorption of a liquid by a sample of material, the combination of a vessel having a top opening, a screen mounted horizontally across the opening, a plurality of spaced supporting elements mounted in the walls of the opening and engaging the screen from beneath, a capillary tube connected at one end to the vessel and mounted horizontally with its passage in the plane of the screen, means for supplying the liquid to the vessel and tube, and means for pressing the sample flat upon the screen.

5. In apparatus for measuring the rate of absorption of a liquid by a sample of material, the combination of a vessel having a top opening, a screen mounted horizontally across the opening, a plurality of bars mounted in the walls of the opening to extend across the screen, the bars having sharp edges engaging the screen from beneath, a capillary tube connected at one end to the vessel and mounted horizontally with its passage in the plane of the screen, means for supplying the liquid to the vessel and tube, and means for pressing the sample flat upon the screen.

6. Apparatus for measuring the rate of absorption of a liquid by a sample of material, which comprises a vessel having a top opening, a screen mounted horizontally across the opening, a capillary tube connected at one end to the vessel and mounted horizontally with its passage in the plane of the screen, means for supplying the liquid to the vessel and tube, a timing device, a carriage movable along the tube, means for pressing the sample upon the screen and simultaneously starting the timing device, means on the carriage for bearing a beam of light through the liquid column in the tube, and means for stopping the timing device, when the end of the liquid column has passed beyond the beam, said means including an element on the carriage intercepting the beam after it has passed through the tube.

7. Apparatus for measuring the rate of absorption of a liquid by a sample of material, which comprises a vessel having a top opening, a screen mounted horizontally across the opening, a capillary tube connected at one end to the vessel, a support for holding the tube horizontal with its passage in the plane of the screen, means for supplying the liquid to the vessel and tube, a timing device, a carriage mounted on the support and movable along the tube, means for pressing the sample upon the screen and simultaneously starting the timing device, means on the carriage for passing a beam of light through the liquid column in the tube, and means for stopping the timing device, when the end of the liquid column has passed beyond the beam, said means including an element on the carriage intercepting the beam after it has passed through the tube.

8. In apparatus for measuring the rate of absorption of a liquid by a sample of material, the combination of a vessel having a top opening, a screen mounted across the opening, a plate overlying the screen and having a central opening through which part of the screen is exposed, a tubular member extending upwardly from the plate around and spaced from said central opening, said member being adapted to support a sample spaced above the screen, means for supplying liquid to the vessel and maintaining the level of the liquid in the plane of the screen, and means operable to engage the upper surface of a sample resting on the tubular member and press the sample downwardly into face contact with the screen.

9. In apparatus for measuring the rate of absorption of a liquid by a sample of material, the combination of a vessel having a top opening, a screen mounted across the opening, a tubular member extending upwardly around the screen and adapted to support a sample spaced above the screen, means for supplying liquid to the vessel and maintaining the level of the liquid in the plane of the screen, and means operable to engage the upper surface of a sample resting on the tubular member and press the sample downwardly into face contact with the screen.

10. In apparatus for measuring the rate of absorption of a liquid by a sample of material, the combination of a vessel having a top opening, a screen mounted across the opening, a tubular member extending upwardly around the screen and adapted to support a sample spaced above the screen, means for supplying liquid to the vessel and maintaining the level of the liquid in the plane of the screen, a plate adapted to engage the upper surface of a sample resting on the tubular member and press the sample into face contact with the screen, and a mounting movably supporting the plate.

11. In apparatus for measuring the rate of absorption of a liquid by a sample of material, the combination of a vessel having a top opening, a screen mounted across the opening, a tubular member extending upwardly around the screen and adapted to support a sample spaced above the screen, means for supplying liquid to the vessel and maintaining the level of the liquid in the plane of the screen, a plate adapted to engage the upper surface of a sample resting on the tubular member and press the sample into face contact with the screen, an arm mounted to swing to bring a portion thereof over the screen, and a stem attached to the plate and movably carried by said portion of the arm.

12. Apparatus for measuring the rate of absorption of a liquid by a sample of material, which comprises a vessel having a top opening, a flat liquid-permeable support mounted horizontally across the opening, the support having openings through which liquid may pass without appreciable resistance to a flow, a capillary tube connected at one end to the vessel and mounted horizontally with its passage substantially in the plane of the support, means for supplying liquid to the vessel and tube, a timing device, means for pressing the sample upon the support and simultaneously starting the timing device, and means operable, when the end of the liquid column in the tube passes a selected point, for stopping the timing device.

13. In apparatus for measuring the rate of absorption of a liquid by a sample of material, the combination of a vessel having a top opening, a screen mounted across the top opening, means surrounding the screen and extending upwardly above the level of the screen for supporting a sample above the screen, means for maintaining the level of the liquid in the vessel in the plane of the screen, and means operable to engage the top surface of a sample resting on said supporting means and press the sample into contact with the screen.

14. In apparatus for measuring the rate of absorption of a liquid by a sample of material, the combination of a vessel having a top opening, a screen mounted across the top opening, means surrounding the screen and extending upwardly above the level of the screen for supporting a sample above the screen, means for maintaining the level of the liquid in the vessel in the plane of the screen, a plate overlying the screen and having an opening through which the screen is exposed, and a movably mounted element operable to engage the upper surface of a sample resting upon the supporting means and press the sample into contact with the screen throughout the exposed area thereof and with the surface of the plate around the opening therein.

STANLEY PAUL HUNT.

REFERENCES CITED

The following references are of record in the file of this patent:

UNITED STATES PATENTS

| Number | Name | Date |
|---|---|---|
| 1,525,495 | Carson | Feb. 10, 1925 |
| 1,708,074 | Allen | Apr. 9, 1929 |
| 2,329,959 | Van Den Akker | Sept. 21, 1943 |